US007426586B2

(12) United States Patent
Dybsetter et al.

(10) Patent No.: US 7,426,586 B2
(45) Date of Patent: Sep. 16, 2008

(54) CONFIGURABLE INPUT/OUTPUT TERMINALS

(75) Inventors: Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 363 days.

(21) Appl. No.: 10/970,530

(22) Filed: Oct. 21, 2004

(65) Prior Publication Data

US 2005/0127402 A1 Jun. 16, 2005

Related U.S. Application Data

(60) Provisional application No. 60/530,036, filed on Dec. 15, 2003.

(51) Int. Cl.
*G06F 3/00* (2006.01)
*G06F 7/38* (2006.01)

(52) U.S. Cl. .................. 710/8; 710/11; 710/12; 710/14; 326/38

(58) Field of Classification Search .......... 710/8, 710/11, 12, 14; 326/38
See application file for complete search history.

(56) References Cited

U.S. PATENT DOCUMENTS

| 4,359,553 | A | 11/1982 | Edwards |
| 4,378,451 | A | 3/1983 | Edwards |
| 4,687,924 | A | 8/1987 | Galvin et al. |
| 4,734,914 | A | 3/1988 | Yoshikawa |
| 4,747,091 | A | 5/1988 | Doi |
| 4,809,286 | A | 2/1989 | Kollanyi et al. |
| 4,916,707 | A | 4/1990 | Rosenkranz |
| 4,932,038 | A | 6/1990 | Windus |
| 5,019,769 | A | 5/1991 | Levinson |
| 5,039,194 | A | 8/1991 | Block et al. |
| 5,041,491 | A | 8/1991 | Turke et al. |
| 5,047,835 | A | 9/1991 | Chang |
| 5,268,949 | A | 12/1993 | Watanabe et al. |
| 5,287,375 | A | 2/1994 | Fujimoto |
| 5,334,826 | A | 8/1994 | Sato et al. |
| 5,383,208 | A | 1/1995 | Queniat et al. |

(Continued)

FOREIGN PATENT DOCUMENTS

EP 0745868 B1 4/2002

(Continued)

OTHER PUBLICATIONS

Yi Cai et al., "Jitter testing for gigabit serial communication transceivers," Jan.-Feb. 2002, IEEE Design and Test of Computers, vol. 19, Issue 1, pp. 66-74.

(Continued)

*Primary Examiner*—Alan Chen
(74) *Attorney, Agent, or Firm*—Workman Nydegger

(57) ABSTRACT

Configuring chip I/O terminals such that they may be input, output, or bi-directional terminals. Furthermore, the I/O terminals may be configured with different signal sources if they are output or bi-directional terminals. In addition, the terminals may be configured to be inverted when operating in either direction. A mechanism is provided to change this configuration as needed, for example, to correspond to different pins on the package as appropriate given the package configuration and other implementation needs. This configurability allows for tremendous flexibility and independent between the chip on which the integrated circuit is embedded and the package.

30 Claims, 6 Drawing Sheets

U.S. PATENT DOCUMENTS

| | | | |
|---|---|---|---|
| 5,392,273 A | 2/1995 | Masaki et al. | |
| 5,396,059 A | 3/1995 | Yeates | |
| 5,448,629 A | 9/1995 | Bosch et al. | |
| 5,516,563 A | 5/1996 | Schumann et al. | |
| 5,557,437 A | 9/1996 | Sakai et al. | |
| 5,574,435 A | 11/1996 | Mochizuki | |
| 5,576,877 A | 11/1996 | Aulet et al. | |
| 5,594,748 A | 1/1997 | Jabr | |
| 5,604,758 A | 2/1997 | AuYeung et al. | |
| 5,673,282 A | 9/1997 | Wurst | |
| 5,748,672 A | 5/1998 | Smith et al. | |
| 5,761,216 A | 6/1998 | Sotome et al. | |
| 5,801,866 A | 9/1998 | Chan et al. | |
| 5,812,572 A | 9/1998 | King et al. | |
| 5,854,704 A | 12/1998 | Grandpierre | |
| 5,926,303 A | 7/1999 | Giebel et al. | |
| 5,953,690 A | 9/1999 | Lemon et al. | |
| 5,956,168 A | 9/1999 | Levinson et al. | |
| 5,966,395 A | 10/1999 | Ikeda | |
| 6,049,413 A | 4/2000 | Taylor | |
| 6,055,252 A | 4/2000 | Zhang | |
| 6,064,501 A | 5/2000 | Roberts et al. | |
| 6,157,022 A | 12/2000 | Maeda et al. | |
| 6,160,647 A | 12/2000 | Gilliland et al. | |
| 6,175,434 B1 | 1/2001 | Feng | |
| 6,188,059 B1 | 2/2001 | Nishlyama et al. | |
| 6,198,558 B1 | 3/2001 | Graves et al. | |
| 6,205,505 B1 | 3/2001 | Jau et al. | |
| 6,222,660 B1 | 4/2001 | Traa | |
| 6,229,788 B1 | 5/2001 | Graves et al. | |
| 6,256,127 B1 | 7/2001 | Taylor | |
| 6,292,497 B1 | 9/2001 | Nakano | |
| 6,297,666 B1 | 10/2001 | Weingarner et al. | |
| 6,313,459 B1 | 11/2001 | Hoffe et al. | |
| 6,351,799 B1 | 2/2002 | Fodlmeier et al. | |
| 6,423,963 B1 | 7/2002 | Wu | |
| 6,473,224 B2 | 10/2002 | Dugan et al. | |
| 6,512,617 B1 | 1/2003 | Tanji et al. | |
| 6,519,255 B1 | 2/2003 | Graves | |
| 6,526,076 B2 | 2/2003 | Cham et al. | |
| 6,570,149 B2 | 5/2003 | Maruyama et al. | |
| 6,574,688 B1 * | 6/2003 | Dale et al. | 710/52 |
| 6,577,157 B1 * | 6/2003 | Cheung et al. | 326/38 |
| 6,594,050 B2 | 7/2003 | Jannson et al. | |
| 6,631,146 B2 | 10/2003 | Pontis et al. | |
| 6,643,472 B1 | 11/2003 | Sakamoto et al. | |
| 6,661,836 B1 | 12/2003 | Dalal et al. | |
| 6,686,769 B1 * | 2/2004 | Nguyen et al. | 326/40 |
| 6,694,462 B1 | 2/2004 | Reis et al. | |
| 6,748,181 B2 | 6/2004 | Miki et al. | |
| 6,937,949 B1 | 8/2005 | Fishman et al. | |
| 6,941,077 B2 | 9/2005 | Aronson et al. | |
| 6,952,531 B2 | 10/2005 | Aronson et al. | |
| 6,998,871 B2 * | 2/2006 | Mulligan | 326/38 |
| 7,020,567 B2 | 3/2006 | Fishman et al. | |
| 7,058,310 B2 | 6/2006 | Aronson et al. | |
| 2001/0046242 A1 | 11/2001 | Kawakami et al. | |
| 2001/0046243 A1 | 11/2001 | Schie | |
| 2002/0021468 A1 | 2/2002 | Kato et al. | |
| 2002/0027688 A1 | 3/2002 | Stephenson | |
| 2002/0060824 A1 | 5/2002 | Liou et al. | |
| 2002/0097468 A1 | 7/2002 | Mecherle et al. | |
| 2002/0101641 A1 | 8/2002 | Kurchuk | |
| 2002/0105982 A1 | 8/2002 | Chin et al. | |
| 2002/0129379 A1 | 9/2002 | Levinson et al. | |
| 2002/0149821 A1 | 10/2002 | Aronson et al. | |
| 2002/0181519 A1 | 12/2002 | Vilhelmsson et al. | |
| 2002/0181894 A1 | 12/2002 | Gilliand et al. | |
| 2002/0190748 A1 | 12/2002 | Sun et al. | |
| 2003/0053170 A1 | 3/2003 | Levinson et al. | |
| 2003/0110509 A1 | 6/2003 | Levinson et al. | |
| 2003/0113118 A1 | 6/2003 | Bartur | |
| 2003/0169790 A1 | 9/2003 | Chieng et al. | |
| 2003/0210917 A1 | 11/2003 | Stewart et al. | |
| 2003/0219048 A1 * | 11/2003 | Couch | 372/38.01 |
| 2004/0076113 A1 | 4/2004 | Aronson et al. | |
| 2004/0088442 A1 * | 5/2004 | Lee | 710/1 |
| 2004/0120720 A1 | 6/2004 | Chang et al. | |
| 2004/0153913 A1 | 8/2004 | Fishman et al. | |
| 2004/0202210 A1 | 10/2004 | Thornton | |
| 2004/0240886 A1 | 12/2004 | Aronson et al. | |
| 2004/0253003 A1 | 12/2004 | Farmer et al. | |
| 2005/0031352 A1 | 2/2005 | Light et al. | |
| 2005/0058455 A1 | 3/2005 | Hosking et al. | |

FOREIGN PATENT DOCUMENTS

| | | |
|---|---|---|
| EP | 02704344 | 10/2004 |
| EP | 04017254 | 10/2004 |
| EP | 1471671 A2 | 12/2004 |
| JP | 58140175 | 8/1983 |
| JP | 62124576 A | 6/1987 |
| JP | 62235975 A | 10/1987 |
| JP | 62281485 A | 12/1987 |
| JP | 402102589 A | 4/1990 |
| JP | 404023373 A | 1/1992 |
| JP | 06504405 T2 | 5/1994 |
| JP | 06209209 A | 7/1994 |
| JP | 09162811 A | 6/1997 |
| WO | WO 98/00893 | 1/1998 |
| WO | WO 98/00943 | 8/1998 |
| WO | PCT/US02/03226 | 5/2002 |
| WO | WO 02/063800 A1 | 8/2002 |
| WO | WO/2004/098100 | 11/2004 |

OTHER PUBLICATIONS

Maeda, Noriyuki "Notification of Reason(s) for Refusal," Japanese Patent Application No. JP2002-563630, Nakamura, M. et al., Jul. 13, 2005.

Finisar Corp., "App. Note AN-2025: Using the Finisar GBIC I²C Test Diagnostics Port," 1998.

Hausdorf, Reiner, "Mobile Transceiver Measurements with Radiocommunication Service Monitor CMS," News from Rohde & Schwarz, 127, IV, 1989, pp. 4-7.

Webopedia: The 7 Layers of the OSI Model [online] [retrieved Oct. 15, 2003]. Retrieved from Internet: URL: http://webopedia.internet.com/quick_ref/OSI_Layers.asp.

Webopedia.com: Public-Key Encryption [online] [retrieved Oct. 15, 2003]. Retrieved from Internet: URL: http://www.webopedia.com/TERM/p/public_key_cryptography.html.

Webopedia.com: MAC Address [online] [retrieved Oct. 15, 2003]. Retrieved from Internet: URL: http://www.webopedia.com/TERM/M/MAC_address.html.

Webopedia.com: 12C [online] [retrieved Nov. 11, 2003]. Retrieved from Internet: URL: http://www.webopedia.com/TERM/I/12C.html.

Manchester Encoding [online] [retrieved Nov. 12, 2003]. Retrieved from Internet: URL: http://www.erg.abdn.ac.uk/users/gorry/course/phy-pages/man.html.

Documentation entitled "IR Receiver ASSP: T2525", copyright 2003 by Atmel Corporation.

Documentation entitled "IR Receiver for Data Communication: U2538B", copyright 2003 by Atmel Corporation.

Documentation entitled "Low-Voltage Highly Selective IR Receiver IC: T2527", copyright 2002 by Atmel Corporation.

Documentation entitled "Application Note: T2525/26/27", copyright 2003 by Atmel Corporation.

*Optiport SFF BiDi-Transceiver 100 Mbit/s, 1310 nm Tx/1550 nm Rx*, Infineon Technologies, Jun. 22, 2004, pp. 1-14.

*LXT16706/16707 SerDes Chipset*, Intel Products, www.intel.com/design/network/products/optical/phys/1xt16706.htm, Apr. 19, 2002.

*LXT35401 XAUI-to-Quad 3.2G Transceiver*, Intel Products, www.intel.com/design/network/products/optical/phys/1xt35401.htm, Apr. 19, 2002.

Texas Instruments User's Guide, *TLK2201 Serdes EVM Kit Setup and Usage*, Mixed Signal DSP Solutions, Jul. 2000.

Texas Instruments User's Guide, *TLK1501 Serdes EVM Kit Setup and Usage*, Mixed Signal Products, Jun. 2000.

National Semiconductor DS92LV16 Design Guide, *Serializing Made Simple*, Feb. 2002.

Vaishali Semiconductor, *Fibre Channel Transceiver*, VN16117, MDSN-0002-02, Aug. 9, 2001.

Fairchild Semiconductor, Application Note 77, *CMOS, the Ideal Logic Family*, Jan. 1983.

Analog Target Specification, Annex 48B, Published by IEEE New York, May 2001, pp. 6-14.

Amerson et al., "An FPGA for Multi-chip Reconfigurable Logic", IEEE 1996 Custom Integrated Circuits Conference, pp. 137-140.

Knapp et al, "Filed Configurable System-on-Chip Device Architecture", IEEE 2000 Custom Integrated Circuits Conference, pp. 155-158.

\* cited by examiner

CONFIGURABLE INPUT/OUTPUT TERMINALS

CROSS-REFERENCE TO RELATED APPLICATIONS

This application claims the benefit of U.S. Provisional Application No. 60/530,036 filed Dec. 15, 2003, which is incorporated herein by reference in its entirety.

BACKGROUND OF THE INVENTION

1. The Field of the Invention

The present invention relates generally to integrated circuits. More specifically, the present invention relates to mechanisms for operating the input/output terminals to have configurable functionality.

2. Background and Relevant Art

Electronic and computing technology has transformed the way that we work and play. Many electronic or computing systems rely on a variety of components that cooperatively interact to perform complex functions. A component typically includes a chip and a package.

The chip includes the complex circuitry that perform the functions. The chip tends to be composed of a semiconductor (e.g., silicon) or dielectric (e.g., sapphire) upon which the circuitry as fabricated.

The package allows the chip to interface with the printed circuit board, and provides some level of protection for the chip. The protection might include Electro-Magnetic Interference (EMI) shielding, temperature dissipation structures, and/or physical barrier protection against inadvertent contacting the delicate circuit structures on the chip. The package includes a number of pins that are appropriate positioned such that the package may be plugged into a socket on the integrated circuit board. Some or all of these pins may be electrically connected to an appropriate bond pad on the chip, thereby establishing an electrical connection between the chip and the printed circuit board through the package. Accordingly, the chip may receive signals and power supply from the printed circuit board via the package, while providing output signals to the printed circuit board through the package.

If the size of the package is limited by the size of the chip, the package is considered to be "core-bound". If the size of the package is limited by the number of pins on the package, the package is considered to be "I/O bound". In order to preserve valuable printed circuit space, it is advantageous for packages to be as small as possible for a given level of chip functionality. Accordingly, what would be advantageous are mechanisms for reducing the number of pins required for a particular level of chip functionality if the chip is I/O bound.

In addition, in order to avoid an expensive printed circuit board redesign, it is often desirable for improved chips to use the same package design as the previous chip. This would allow for the improved functionality of the new chip to be obtained by simply unplugging the old chip package from the printed circuit board, and plugging in the new chip package into the same place. This represents significant value-add since improved functionality is obtained without a printed circuit board redesign. However, often, the improved chip uses more pins than the previous chip, thereby making the newer package incompatible with the old package. What would be advantageous are mechanisms in which a new chip may be used in the same package as an older chip, despite the newer chip having significant improved functionality that would conventionally use more pins.

Furthermore, different individuals may desire the same functionality of a given chip, yet have different circuit board designs. Accordingly, one customer may have a socket that has thirty pins, and another forty pins. Yet it is desirable for both to have the same chip. Accordingly, what would be advantageous is a mechanism in which the same kind of chip may be incorporated into different packages, despite there being different numbers of pins on the packages.

BRIEF SUMMARY OF THE INVENTION

The foregoing problems with the prior state of the art are overcome by the principles of the present invention, which are directed towards mechanisms for configuring the input/output (I/O) terminals of an integrated circuit to correspond to different pins on the package as appropriate given the package configuration and other implementation needs. This configurability allows for tremendous flexibility and independence between the chip on which the integrated circuit is embedded and the package. Accordingly, different chips may be incorporated within the same package. Furthermore, the same chip may be incorporated into different packages having different footprints and pin counts.

The integrated circuit includes a number of input/output (I/O) terminals including one or more configurable I/O terminals. Each configurable I/O terminal may be specified as an input terminal, an output terminal, or a bi-directional terminal. The integrated circuit includes an input facilitation mechanism configured to allow a signal provided to the configurable I/O terminal to be received by the integrated circuit if the configurable I/O terminal is designated as an input terminal or a bi-directional terminal. On the other hand, an output facilitation mechanism allows signals provided by the integrated circuit to be asserted on the I/O terminal if the configurable I/O terminal is designated as an output terminal or a bi-direction terminal. Since the I/O terminal is configurable, the integrated circuit also includes a mechanism for changing the input/output designation of the configurable I/O terminal.

The integrated circuit may also include a plurality of signal sources. For each configurable I/O terminal that is configured as an output terminal or a bi-directional terminal, a signal source selection mechanism selects one of the signal sources. Also, a signal source routing mechanism provides a signal from the selected signal source to the configurable I/O terminal that is designated as an output terminal or a bi-directional terminal. The signal sources may include, for example, one or more serial interface controllers, a clock, a latch array coupled to a register or a latch coupled to a register bit, or any other mechanism capable of generating a signal.

In addition, the integrated circuit may also have an inversion designation mechanism to designate whether input signals and/or output signals should be inverted. In that case, an inversion enforcement mechanism enforces the inversion designation of the inversion designation mechanism. Each of the above-mechanism may be discrete units or have components that serve more than one of the mechanisms briefly summarized above.

In this manner, at least those I/O terminals that are designated as configurable may be configured with input/output designations, signal source designations, and other configurations (such as inversion designations) as appropriate given the implementation needs.

Accordingly, the configurable I/O terminals may be configured such that the same chip may fit in a wide variety of differently-oriented packages, thereby allowing a single chip design to satisfy many different printed circuit board configurations. Furthermore, the configurable I/O terminals may be configured such that the chip may fit in the same package as a different chip, thereby avoiding a printed circuit board redesign just for changing chips.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for configuring the input/output (I/O) terminals of an integrated circuit to correspond to different pins on the package as appropriate given the package configuration and other implementation needs. This configurability allows for tremendous flexibility and independence between the package and its embedded chip. Each configurable I/O terminal may be specified as an input, output, or bi-directional terminal.

The integrated circuit allows a signal provided to the configurable I/O terminal to be received by the integrated circuit if the configurable I/O terminal is designated as an input terminal or a bi-directional terminal. On the other hand, a signal provided by the integrated circuit is permitted to be asserted on the I/O terminal if the configurable I/O terminal is designated as an output terminal or a bi-direction terminal. Since the I/O terminal is configurable, the integrated circuit also includes a mechanism for changing the input/output designation of the configurable I/O terminal. Mechanisms for selecting a signal source, and inverting the input/output bits are also provided.

Figure 1:
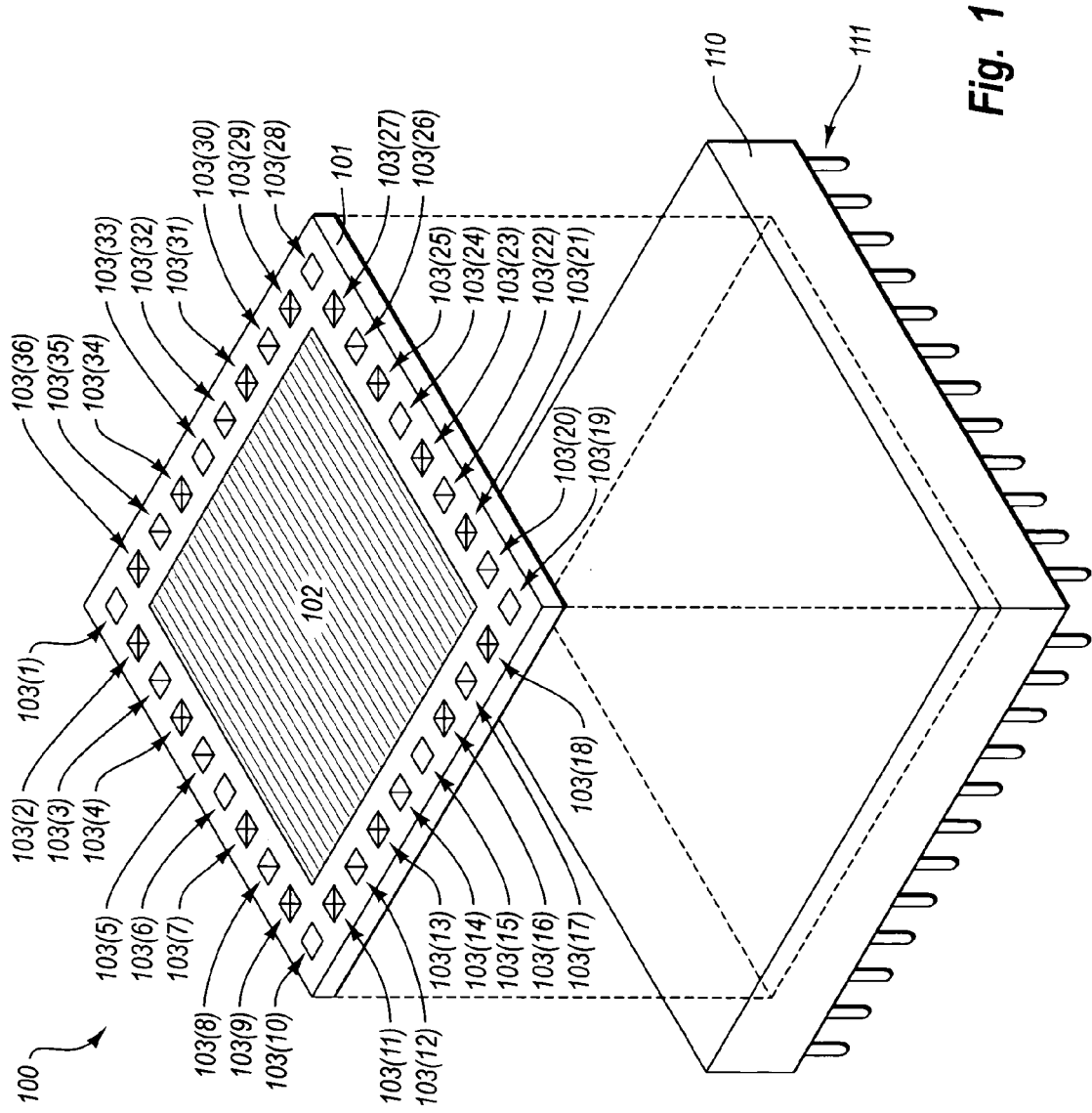
FIG. 1 illustrates in perspective view an integrated circuit / package combination in which the integrated circuit includes a number of input/output (I/O) terminals, at least some of which being configurable.

Turning to the drawings, FIG. 1 illustrates a perspective view of a chip 100. The chip includes an integrated circuit 102 that is fabricated on a substrate 101. The integrated circuit 102 has a number of terminals 103. Specifically, the terminals are illustrated as being terminals 103(1) through 103(36) positioned along the outside edges of the chip 100 on its upper surface. The precise number, orientation, and position of the terminals are not important for the principles of the present invention. The chip 100 is shown by way of example only.

The terminals 103 may include a number of power supply terminals, which the chip uses to power the I/O buffers and propagate the voltage references throughout the chip 100. In the example chip of FIG. 1, terminals 103(1), 103(6), 103(10), 103(15), 103(19), 103(24), 103(28), and 103(33) may be power supply terminals as represented by there being no vertical or horizontal lines in the corresponding square representing the terminal.

The other terminals are input/output (I/O) terminals which carry signals received by or provided by the integrated circuit 102. These I/O terminals are identified by their corresponding square including a vertical line (see terminals 103(1) through 103(5), 103(7) through 103(9), 103(11) through 103(14), 103(16) through 103(18), 103(20) through 103(23), 103(25) through 103(27), 103(29) through 103(32) and 103(34) through 103(36)).

Some of these I/O terminals are configurable as represented by their corresponding square also including a horizontal line to form a plus symbol (see terminals 103(2), 103(4), 103(7), 103(9), 103(11), 103(13), 103(16), 103(18), 103(21), 103(23), 103(25), 103(27), 103(29), 103(31), 103(34) and 103(36). However, this is by way of example only. The precise terminals that are power or I/O terminals, and which of the I/O terminals are configurable is not important to the principles of the present invention.

The chip 100 is often packaged by being embedded within a package 110 that includes a number of pins 111. The precise structure of the package is not important to the principles of the present invention. In fact, the configurability of the I/O terminals allows for a single chip type to be incorporated into a wide variety of packages, and for different kinds of chips to be incorporated into a single package type.

Figure 2:
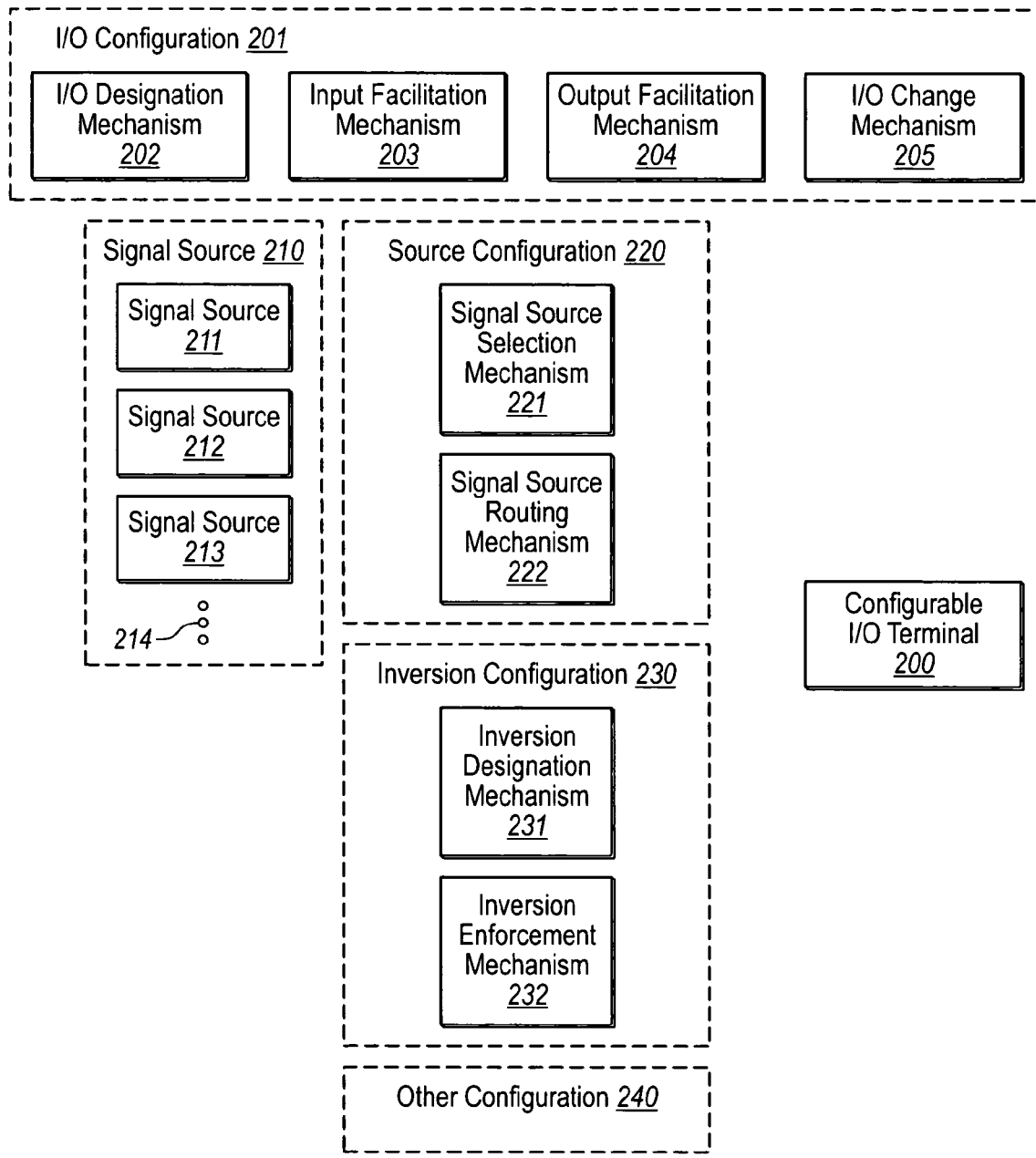
FIG. 2 schematically illustrates a configurable I/O terminal in combination with a number of modules that configure the I/O terminal.

FIG. 2 schematically illustrates a configurable I/O terminal in combination with a number of modules that configure the I/O terminal in accordance with the principles of the present invention. The modules shown in FIG. 2 operate to configure a single configurable I/O terminal 200. Similar structures may be used to configure each configurable I/O terminal on the chip.

Each configurable I/O terminal may be designated as an input terminal, an output terminal, or a bi-directional terminal. Accordingly, the integrated circuit 102 includes I/O configuration modules 201. The I/O configuration modules 201 include an input/output designation mechanism 202, an input facilitation mechanism 203, an output facilitation mechanism 204, and an I/O change mechanism 205. The input/output designation mechanism 202 is configured to designate whether the configurable input/output terminal 200 is an input terminal, an output terminal, or a bi-directional terminal. The input facilitation mechanism 203 is configured to allow a signal provided to the configurable input/output terminal 200 to be received by the integrated circuit 102 if the configurable input/output terminal 200 is designated as an input terminal or a bi-directional terminal. The output facilitation mechanism 204 is configured to allow a signal provided by the integrated circuit 102 to be asserted on the configurable input/output terminal 200 if the configurable input/output terminal 200 is designated as an output terminal or a bi-direction terminal. The input/output change mechanism 205 is configured to change the input/output designation of the configurable input/output terminal if needed.

The integrated circuit may also include a number of signal sources 210 that may serve as signal sources for any of the configurable I/O terminals such as configurable I/O terminal 200. The signal source 210 is illustrated to include three signal sources 211, 212, and 213, amongst potentially others as represented by the vertical ellipses 214. The signal sources may include, for example, serial interface controllers, clocks, registers coupled to latch arrays, or a register bit coupled to a flip flop.

If the configurable I/O terminal 200 is configured as an output terminal, or a bi-direction terminal, then source configuration modules 220 assist in allowing an appropriate one of the signal sources 210 serve as a signal source for the terminal 200. The source configuration modules 220 include a signal source selection mechanism 221 configured to select one of the signal sources, and a signal source routing mechanism 222 configured to provide a signal from the selected signal source to the configurable I/O terminal 200.

The configurable I/O terminal 200 may also include inversion configuration modules 230 for setting the inversion characteristics of the configurable I/O terminal 200. Inversion characteristics include, for example, whether input signals and/or output signals are to be inverted. The inversion configuration modules 230 include an inversion designation mechanism 231 configured to designated whether input signals and/or output signals should be inverted, and an inversion enforcement mechanism 232 configured to enforce the inversion designation of the inversion designation mechanism. Other configuration modules 240 may be provided to configure other aspects of the configurable I/O terminal 200.

For example, the I/O terminal 200 may be configured for pull up or pull down characteristics. For instance, the I/O terminal may be a high impedance terminal, a weak pull up terminal, a strong pull up terminal, a weak pull down terminal, or a strong pull down terminal. This represents an example of the other configuration options that may be supported by other configuration modules 240. In this case, a multiplexer may multiplex the appropriate pull up or pull down resistors (or high impedance connection) to the I/O terminal 200 in response to a configuration input to the multiplexer.

FIG. 2 is illustrated to provide a schematic overview of the high level functionality of example configuration mechanism. In any given circuit implementation of this functionality, various circuit components may serve one or more of the mechanisms described above. Accordingly, the various mechanisms need not be discrete. In addition, several of the mechanisms may have components that provide configuration utility to multiple configurable I/O terminals, not just the configurable I/O terminal. That said, a specific circuit example that incorporates the various mechanisms illustrated in FIG. 2 will now be described. The principles of the present invention are not, however, limited to any specific circuit.

Figure 3A:
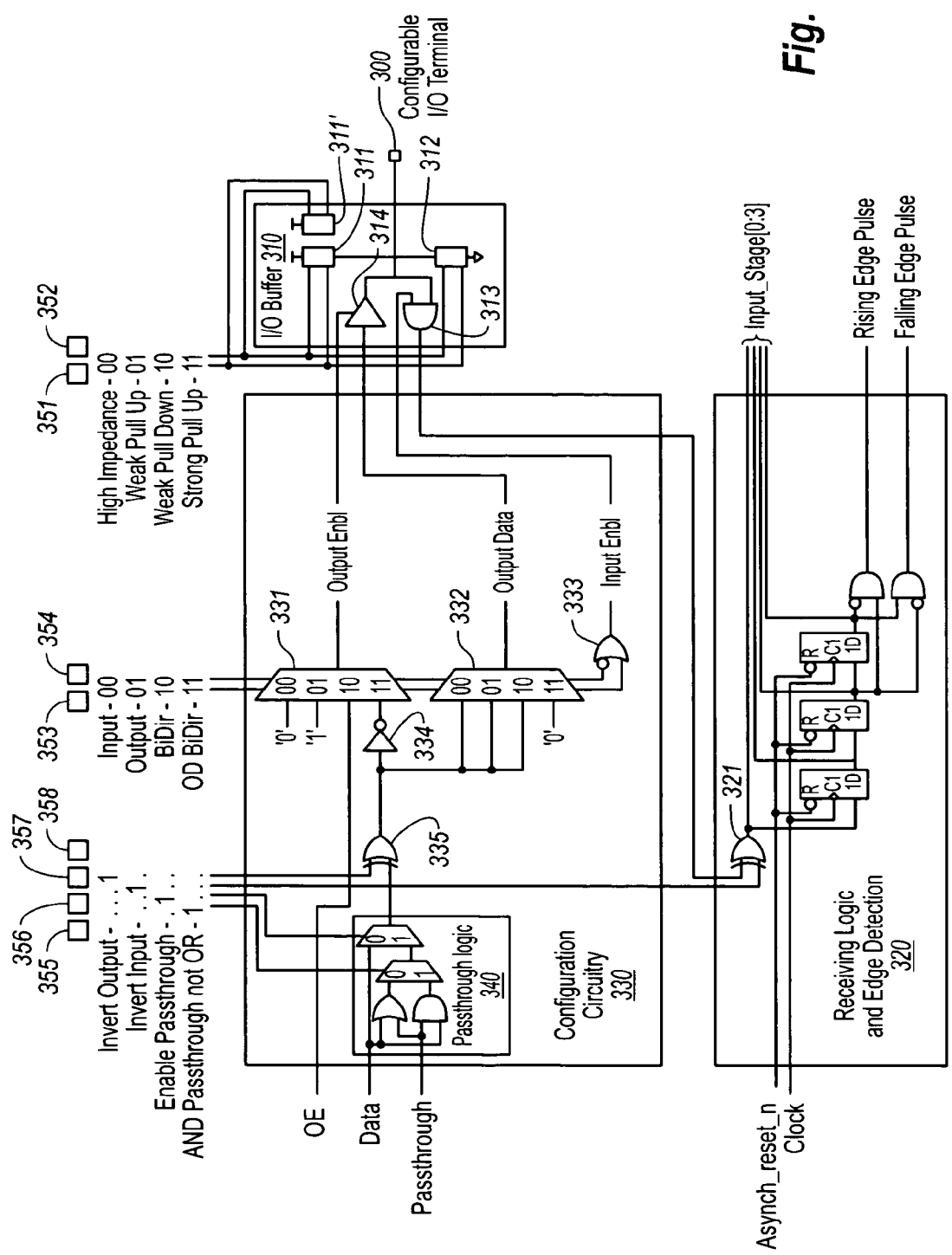
FIG. 3A is a circuit diagram of configuration circuitry for setting the input/output properties, the inversion properties, and potentially the pass through properties of the I/O terminal.

FIG. 3A is a circuit diagram of configuration circuitry for setting the input/output properties, the inversion properties, and potentially the pass through properties of the configurable I/O terminal 300.

The configuration I/O terminal 300 is connected to an I/O buffer 310. A weak pull up element 311 couples the configurable output terminal 300 to a high voltage source if activated. A strong pull up element 311' couples the terminal 300 to a high voltage source if activated. A pull down element 312 couples the 300 to a low voltage source if activated. If the configurable I/O terminal 300 is to be configured as a high impedance terminal, then the configuration input 351 and 352 may be designated 00, thereby decoupling the pull up element 311 and the pull down element 312 from the terminal 300. If the terminal 300 is configured as a weak pull up using configuration input 01, then a weak pull up element 311 is coupled to the terminal 300. If designated as a weak pull down using configuration input 10, then weak pull down element 312 is coupled to the terminal 300. If the terminal 300 is configured as a strong pull up using configuration input 11, then a strong pull up element 311' is coupled to the terminal 300. A possible resistance value for the weak pull up resistor 311 and weak pull down resistor 312 is 30 kΩ. A possible resistance value for the strong pull up resistor 311' is 4.7 kΩ.

The I/O buffer 310 also includes a receiver AND gate 313 which receives the "Input Enbl" signal and the signal at the terminal 300. Accordingly, when the "Input Enbl" signal is high, the signal at the terminal 300 is provided to the receiving logic and edge detection module 320. As will be apparent to those of ordinary skill in the art upon reading this description and evaluating FIG. 3A, the receiving logic and edge detection module 320 generates four signals "Input_Stage[0:3]" which represent the four signals received during the most recent four clock cycles of the signal "Clock" assuming that the reset signal "Asynch_reset_n" signal has not been recently applied, and assuming that the "Input Enbl" signal has been high during those four most recent clock signals. These signals "Input_Stage[0:3]" may be provided to the remainder of the integrated circuit 102. As will also be apparent, the receiving logic and edge detection module 320 generates a "Rising Edge" pulse if a rising edge was detected, and generates a "Falling Edge" pulse if a falling edge was detected. The receiving logic and edge detection module 320 represents one example of an input facilitation mechanism 203 of FIG. 2.

The I/O buffer 310 also includes a driver 314 which provides the "Output Data" signal on the configurable I/O terminal 300 when the driver is activated with a high "Output Enbl" signal. The configuration circuitry 330 includes a multiplexer 331 which provides the "Output Enbl" signal based on two bits of I/O configuration code.

A two-bit I/O configuration code is also provided to the configuration circuitry 330. The two-bit I/O configuration code may be provided from, for example, two one-bit memory locations 353 and 354. An I/O configuration code of "00" indicates that the terminal 300 is to operate as an input terminal only. Accordingly, an I/O configuration code "00" causes a logical zero to be applied via the multiplexer 331 as the "Output Enbl" signal thereby isolating the "Output Data" signal from the terminal 300. Similarly, this code is applied to the OR gate 333 having the inverted input, thereby causing the "Input Enbl" signal to be high. Accordingly, the I/O configuration code of "00" does cause the terminal 300 to behave as an input terminal.

An I/O configuration code of "01" indicates that the terminal 300 is an output terminal only. This code causes a logical one to be applied via the multiplexer 331 as the "Output Enbl"

signal thereby coupling the "Output Data" signal to the terminal 300. This code is also applied to the OR gate 333 with the logical one being inverted to a logical zero. Accordingly, the "Input Enbl" signal is low, thereby isolating the configurable I/O terminal from the receiving logic and edge detection module 320. An I/O configuration code of "01" thus causes the terminal 300 to behave as an output terminal by applying the signal "Output Data" to the terminal 300.

An I/O configuration code of "10" indicates that the configurable I/O terminal 300 is bi-directional. This code is applied to the OR gate 333 causing the "Input Enbl" signal to be high. Accordingly, whatever signal is provided to or received at the terminal 300 will also be provided to the receiving logic and edge detection 320, even if the signal is being asserted by the integrated circuit 102 itself. During operation, the integrated circuit 102 will ignore the received signals if it is providing data on the terminal 300, unless it is performing self-diagnostics. This code also causes the multiplexer 331 to pass the signal "OE" as the "Output Enbl" signal. Accordingly, the component that generates the "OE" signal controls the timing of when the signal "Output Data" is coupled to and isolated from the configurable I/O terminal 300. The component generating signal "OE" may use any received signals to time the output signals so that collisions between input and output signals at the terminal 300 are avoided. For example, typically serial interface controllers have such collision avoidance logic for use on bi-directional data lines. Accordingly, the I/O configuration code of "10" causes the terminal 300 to operate as a bi-directional terminal, in which the component generates the signal "OE" to implement some collision avoidance timing.

The remaining I/O configuration codes "11" is for configuring the configurable I/O terminal 300 as an open drain bi-directional terminal. As this configuration interrelates heavily to the inversion and passthrough configuration codes, this I/O configuration will be described with frequent reference to the inversion and passthrough configuration codes. The "AND Passthrough not OR" configuration bit comes from one-bit memory location 355. The "Enable Passthrough" configuration bit comes from one-bit memory location 356. The "InvertInput" bit comes from one-bit memory location 357. The "InvertOutput" bit comes from one-bit memory location 358.

The open-drain configuration may be used with interfaces such as the I²C or when there are multiple drivers (possibly multiple chips) driving the same signal. For this open-drain mode, the output is only driven to a '0'-a '1' will be achieved by a pull up resistor and placing the output in a high impedance state. Providing this configuration mechanism simplifies the use of this mode with either a CPU program or other hardware source. This mode may be emulated by configuring it as bidir mode "10" and setting the output source to "0" and then driving the output-enable to a "1" to drive a "0" on the output or setting the output-enable to "0" to let the output rise to a "1". Therefore, by implementing the "11" open drain configuration, the user/hardware source may not need to know the output configuration.

If the terminal is configured as open drain bi-directional, the "Input Enbl" signal is high indicating once again that the signals at the terminal 300 are received at the receiving logic and edge detection module 320. Furthermore, if the "Enable Passthrough" configuration bit is low and the "InvertOutput" configuration bit is also low, then the signal "Output Enbl" is low when the signal "Data" is high, and the signal "Output Enbl" is high when the signal "Data" is low. Accordingly, the signal "Output Data" is coupled to the terminal 300 only when the "Data" signal is low.

The purpose of the Passthrough mode is to provide a high speed path through the chip without the delay of a data processor or other sequential logic passing it along. An actual passthrough example is the "TX Disable" signal. This signal disables the laser and must take effect within a specific period of time. There are additional reasons to disable the laser, so "TX Disable" is OR'ed with an internal value and the combined value is driven to laser-driver chip. The "TX Disable" signal has additional functions, so it must be monitored as an input as well.

If the "Enable Passthrough" configuration bit is low and the "InvertOutput" configuration bit is high, the then the signal "Output Enbl" is high when the signal "Data" is high, and the signal "Output Enbl" is low when the signal "Data" is low. Accordingly, the signal "Output Data" is coupled to the terminal 300 only when the "Data" signal is high.

If the "Enable Passthrough" configuration bit is high, the "AND Passthrough not OR" configuration bit is low, then OR-based passthrough is enabled. In this case, if the "InvertOutput" configuration bit is low, then if either or both of the "Data" signal and "Passthrough" signal are high, then the "Output Enbl" signal is low. If none of the "Data" signal and "Passthrough" signal are high, then the "Output Enbl" signal is high. If, on the other hand, the "InvertOutput" bit is high, then if either or both of the "Data" signal and "Passthrough" signal is high, then the "Output Enbl" signal is high. In this case, if none of the "Data" signal and "Passthrough" signal are high, then the "Output Enbl" signal is low.

If the "Enable Passthrough" configuration bit is high, the "AND Passthrough not OR" configuration bit is high, then AND-based passthrough is enabled. In this case, if the "InvertOutput" configuration bit is low, then if both of the "Data" signal and "Passthrough" signal are high, then the "Output Enbl" signal is low. If none or only one of the "Data" signal and "Passthrough" signal are high, then the "Output Enbl" signal is high. If, on the other hand, the "InvertOutput" bit is high, then if both of the "Data" signal and "Passthrough" signal are high, then the "Output Enbl" signal is high. In this case, if none or only one of the "Data" signal and "Passthrough" signal are high, then the "Output Enbl" signal is low.

In this circuit, the multiplexer 331, the OR gate 333, the I/O configuration codes, the one-bit memory locations 353 and 354, the "OE" signal, and the components the multiplexer 370 (described with respect to FIG. 3B) that generated the "OE" signal represent the input/output designation mechanism 202 of FIG. 2.

Now the generation of the "Output Data" signal will be described. If the I/O configuration code is "11" indicating that the terminal 300 is an open drain bi-directional terminal, then the multiplexer 332 causes the "Output Data" signal to be low. Accordingly, the terminal 300 is driven low when the "Output Enbl" signal is high during the occasions described above. Specifically, the terminal is driven low in the following circumstances when the I/O configuration code is "11" for open drain bi-directional:

1) "Enable Passthrough"=low, "InvertOutput"=low, and "Data"=low;
2) "Enable Passthrough"=low, "InvertOutput"=high, "Data"=high;
3) "Enable Passthrough"=high, "AND Passthrough not OR"=low, "InvertOutput"=low, "Data"=low, "Passthrough"=low;
4) "Enable Passthrough"=high, "AND Passthrough not OR"=low, "InvertOutput"=high, "Data" and/or "Passthrough"=high;

5) "Enable Passthrough"=high, "AND Passthrough not OR"=high, "InvertOutput"=low, none or only one of "Data" and "Passthrough"=high; and
6) "Enable Passthrough"=high, "AND Passthrough not OR"=high, "InvertOutput"=high, "Data"=high, "Passthrough"=high.

If, on the other hand, the I/O configuration code is "00" for input terminal only, "01" for output terminal only, or "10" for bi-directional terminal, then the multiplexer 332 provides the Output Data in the same manner, depending only on the "Data" and "Passthrough" signals, "InvertOutput", "Enable Passthrough", and potentially also the "AND Passthrough not OR" configuration bits. It is noted however, that it does not matter what the "Output Data" signal is if the terminal 300 is configured as an input terminal since the "Output Data" signal is isolated from the terminal 300 in this mode. Furthermore, it does not matter what the "Output Data" signal is if the terminal 300 is configured as a bi-directional terminal and the signal "OE" is low, since likewise, the "Output Signal" will be isolated from the terminal 300 in this mode as well.

Specifically, if the terminal 300 is designated as an input terminal only, an output terminal only, or a bi-directional terminal (other than the open drain bi-directional), then the "Output Data" signal is high under any of the following conditions:
1) "Enable Passthrough"=low, "InvertOutput"=low, and "Data"=high;
2) "Enable Passthrough"=low, "InvertOutput"=high, "Data"=low;
3) "Enable Passthrough"=high, "AND Passthrough not OR"=low, "InvertOutput"=low, "Data" and/or "Passthrough"=high;
4) "Enable Passthrough"=high, "AND Passthrough not OR"=low, "InvertOutput"high, "Data"=low, "Passthrough"=low;
5) "Enable Passthrough"=high, "AND Passthrough not OR"=high, "InvertOutput"=low, "Data"=high, "Passthrough"=high; and
6) "Enable Passthrough"=high, "AND Passthrough not OR"=high, "InvertOutput"=high, none or only one of "Data" and "Passthrough"=high.

Furthermore, the "Output Data" signal is low under any of the following conditions:
1) "Enable Passthrough"=low, "InvertOutput"=low, and "Data"=low;
2) "Enable Passthrough"=low, "InvertOutput"=high, "Data"=high;
3) "Enable Passthrough"=high, "AND Passthrough not OR"=low, "InvertOutput"=low, "Data"=low, "Passthrough"=low;
4) "Enable Passthrough"=high, "AND Passthrough not OR"=low, "InvertOutput"=high, "Data" and/or "Passthrough"=high;
5) "Enable Passthrough"=high, "AND Passthrough not OR"=high, "InvertOutput"=low, none or only one of "Data" and "Passthrough"=high; and
6) "Enable Passthrough"=high, "AND Passthrough not OR"=high, "InvertOutput"=high, "Data"=high, "Passthrough"=high.

In this circuit, the multiplexer 332 configured as illustrated represents an output facilitation mechanism 204 of FIG. 2. The two one-bit memory locations 357 and 358 represent the inversion designation mechanism 231 of FIG. 2. The XOR gate 335 configured as shown represents the inversion enforcement mechanism 232 of FIG. 2. The passthrough logic 340 represents other configuration mechanism 240 of FIG. 2.

Figure 3B:
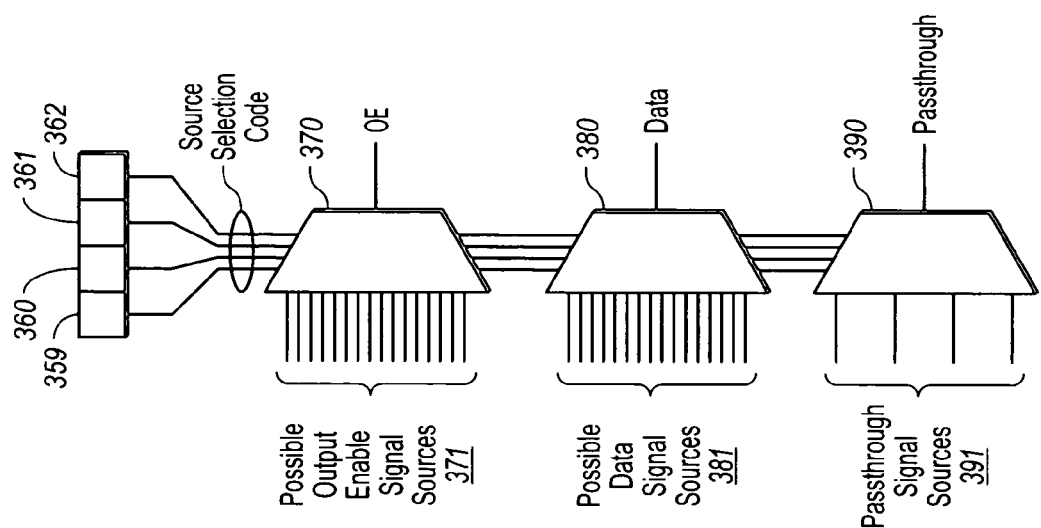
FIG. 3B illustrates a circuit diagram of configuration circuitry for setting the signal source of the I/O terminal when the I/O terminal is configured as an output terminal or bi-direction terminal.

FIG. 3B illustrates a circuit diagram of configuration circuitry for setting the signal source of the I/O terminal when the I/O terminal is configured as an output terminal or bi-direction terminal. Four one-bit memory locations 359 through 362 store a four-bit source selection code whereby up to 16 signal sources may be selected. For more signal sources, more bits may be used. For eight or less signal sources, less bits might be used. The one-bit memory locations 359 through 362 represent an example of the signal source selection mechanism of FIG. 2.

The source selection code is passed to a multiplexer 380 that allows the selected possible data signal source 381 to control the "Data" Signal. Although the output of multiplexer 380 is termed "Data", the output may be any signal that is desired to be output on the terminal 300 including data, clock or other signals. If the signal source is a register location, the processor or other component may directly control the "Data" signal by writing to the corresponding register location. The multiplexer 380 configured as shown represents an example of a signal source routing mechanism of FIG. 2. In the same fashion as the output data selection (and using the same select code), the input signals are selected among all of the configurable I/O and routed to the appropriate destination.

The source selection code is also passed to a multiplexer 370 for demultiplexing the appropriate output enable signal corresponding to the possible output enable signal sources 371. If the signal source is capable of generating its own output enable signal, then the corresponding output enable signal may be provided by the corresponding signal source. If, on the other hand, the signal source is not capable of generating its own output enable signal, then the corresponding output enable signal may be provided by a processor or other logic in communication with the signal source, as appropriate given the signal source.

The source selection code is also passed to a multiplexer 390 for demultiplexing the appropriate passthrough signal corresponding to the corresponding to the possible passthrough signal sources 371. Once again, if the signal source is capable of generating its own passthrough signal, then the corresponding passthrough signal may be provided by the corresponding signal source. If, on the other hand, the signal source is not capable of generating its own passthrough signal, then the corresponding output enable signal may be provided by a processor or other logic in communication with the signal source, as appropriate given the signal source. In this embodiment, there are only three signal sources that may use the passthrough feature. In this embodiment, the passthrough source is the input of another configurable I/O. It is also hard wired to a single I/O buffer but there are 8 total passthrough paths.

Having described the features of the present invention with respect to a specific circuit example in FIGS. 3A and 3B, the broad principles of the present invention are not limited to any specific circuit. There are countless circuits that may be used to implement the features of the present invention.

Figure 4:
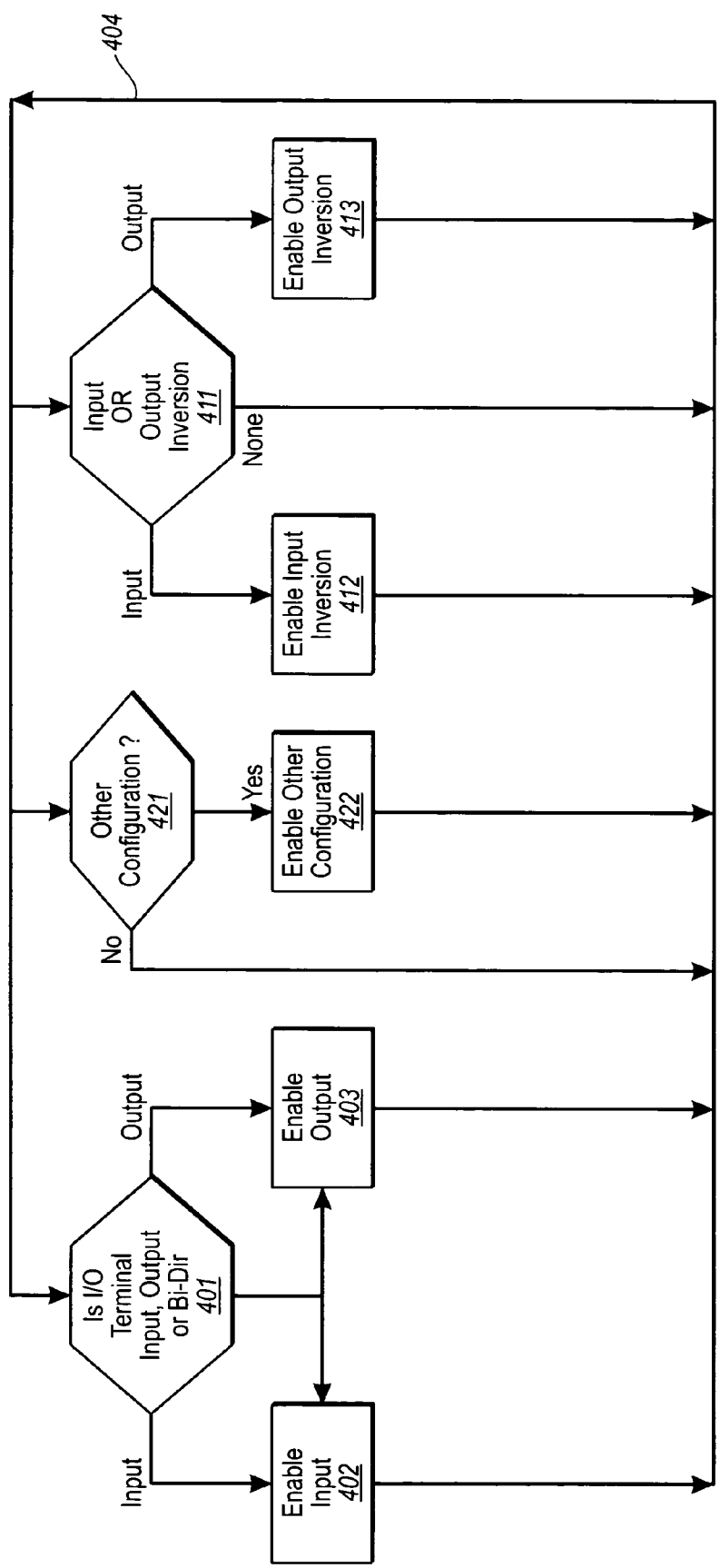
FIG. 4 illustrates a flowchart of a method for configuring the I/O terminal in accordance with the principles of the present invention.

FIG. 4 illustrates a flowchart of a method 400 for configuring the I/O terminal in accordance with the principles of the present invention. The method may be performed for each configurable I/O terminal on the chip. In addition, the method may be repeated for each individual configurable I/O terminal if reconfiguration of that I/O terminal is desired.

The configurable input/output terminal is reversible determined to be an input terminal, an output terminal, or a bi-directional terminal (decision block 401). The determination may be made, for example, by writing specific values to the one-bit locations 353 and 354 of FIG. 3A. If the configurable input/output terminal is determined to be an input terminal or a bi-directional terminal (INPUT or BI-DIR in decision block 401), then the chip allows a signal provided to the configurable input/output terminal to be received by the integrated circuit (act 402). If the configurable input/output terminal is determined to be an output terminal or a bi-directional terminal (OUTPUT or BI-DIR in decision block 401), an act of allowing a signal provided by the integrated circuit to be asserted on the configurable input/output terminal (act 403). Then, if the input/output designation of the configurable input/output terminal is desired to be changed at some future time, the process repeats as represented by arrow 404.

In addition, the configurable input/output terminal may be reversible determined to be output inverted or input inverted (decision block 411). The determination may be made, for example, by writing specific values to the one-bit locations 357 and 358 of FIG. 3A. If the configurable input/output terminal is determined to be input inverted (INPUT in decision block 411), then the input signal is inverted (act 412). For example, referring to FIG. 3A, the "InvertInput" configuration bit is provided to the XOR gate 321 to invert the received data if the "InvertInput" configuration bit is high, and otherwise to leave the received data uninverted. If the configurable input/output signal is determined to be output inverted (OUTPUT in decision block 411), the output signals are inverted (act 413).

It may also be determined whether other configurations are to occur (decision block 421). If not (NO in decision block 421), then the process ends for potential repeating (see arrow 404) when a new configuration is desired. If other configurations are to occur (YES in decision block 421), then the configuration is enabled (act 422). For example, if the configuration is to select a signal source, the act of enabling the configuration includes allowing a signal provided by the integrated circuit to be asserted on the configurable input/output terminal. Then, if the input/output designation of the configurable input/output terminal is desired to be changed at some future time, the process repeats as represented by arrow 403.

Having described the basic principles of the present invention, a particular example environment will now be described, although the present invention is not limited by any means to this example environment.

Figure 5:
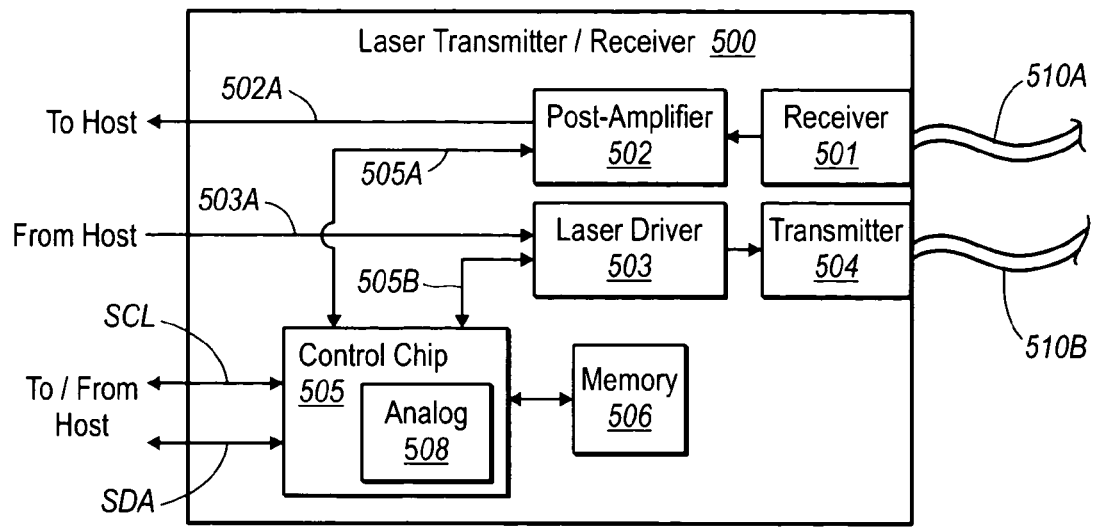
FIG. 5 illustrates a schematic diagram of a laser transmitter/receiver that represents one of many systems in which the principles of the present invention may be employed.

FIG. 5 illustrates a laser transmitter/receiver 500 in which the principles of the present invention may be employed. While the laser transmitter/receiver 500 will be described in some detail, the laser transmitter/receiver 500 is described by way of illustration only, and not by way of restricting the scope of the invention. The principles of the present invention are suitable for 1 G, 2 G, 4 G, 10 G and higher bandwidth fiber channels. Furthermore, the principles of the present invention may be implemented in laser transmitter/receivers of any form factor such as XFP, SFP and SFF, without restriction The laser transmitter/receiver 500 receives an optical signal from fiber 510A using receiver 501. The receiver 501 transforms the optical signal to an electrical signal and provides that electrical signal to a post-amplifier 502. The post-amplifier 502 amplifies the signal and provides the amplified signal to the host as represented by arrow 502A.

The laser transmitter/receiver 500 may also receive electrical signals from the host for transmission onto the fiber 510B. Specifically, the laser driver 503 receives the electrical signal as represented by the arrow 503A, and drives the transmitter 504 (i.e., the laser) with signals that cause the transmitter 504 to emit onto the fiber 510B optical signals representative of the information in the electrical signal provided by the host.

The behavior of the receiver 501, the post-amplifier 502, the laser driver 503, and of the transmitter 504 may vary dynamically due to a number of factors. For example, temperature changes, power fluctuations, and feedback conditions may each affect the performance of these components. Accordingly, the laser transmitter/receiver 500 includes a control chip 505, which evaluates temperature and voltage conditions, and receives information from the post-amplifier 502 (as represented by arrow 505A) and from the laser driver 503 (as represented by arrow 505B), which will allow the control chip 505 to counteract the dynamically varying performance, and detect when there is a loss of signal.

Specifically, the control chip 505 may counteract these changes by adjusting settings on the post-amplifier 502 and/or the laser driver 503 as represented by the arrows 505A and 505B. These settings adjustments are quite intermittent since they are only made when temperature or voltage or other low frequency changes so warrant. Accordingly, the setting adjustments may be made by a guaranteed header two-wire interface of the type described above with respect to FIGS. 1, 2, and 3A through 3C.

The control chip 505 has access to a non-volatile memory 506, which in one embodiment, is an Electrically Erasable and Programmable Read Only Memory (EEPROM). Data and clock signals may be provided from the host to the control chip 505 using the serial clock line SCL, and the serial data line SDA. Also data may be provided from the control chip 505 to the host using serial data signal SDA to allow for digital diagnostics and readings of temperature levels, transmit/receiver power levels, and the like.

The control chip 505 includes both an analog portion 508 and a digital portion. Together, they allow the control chip to implement logic digitally, while still largely interfacing with the rest of the laser transmitter/receiver 500 using analog signals. For example, the analog portion 508 may contain digital to analog converters, and analog to digital converters, high speed comparators (e.g., for event detection), voltage based reset generators, voltage regulators, voltage references, clock generator, and other analog components.

Figure 6:
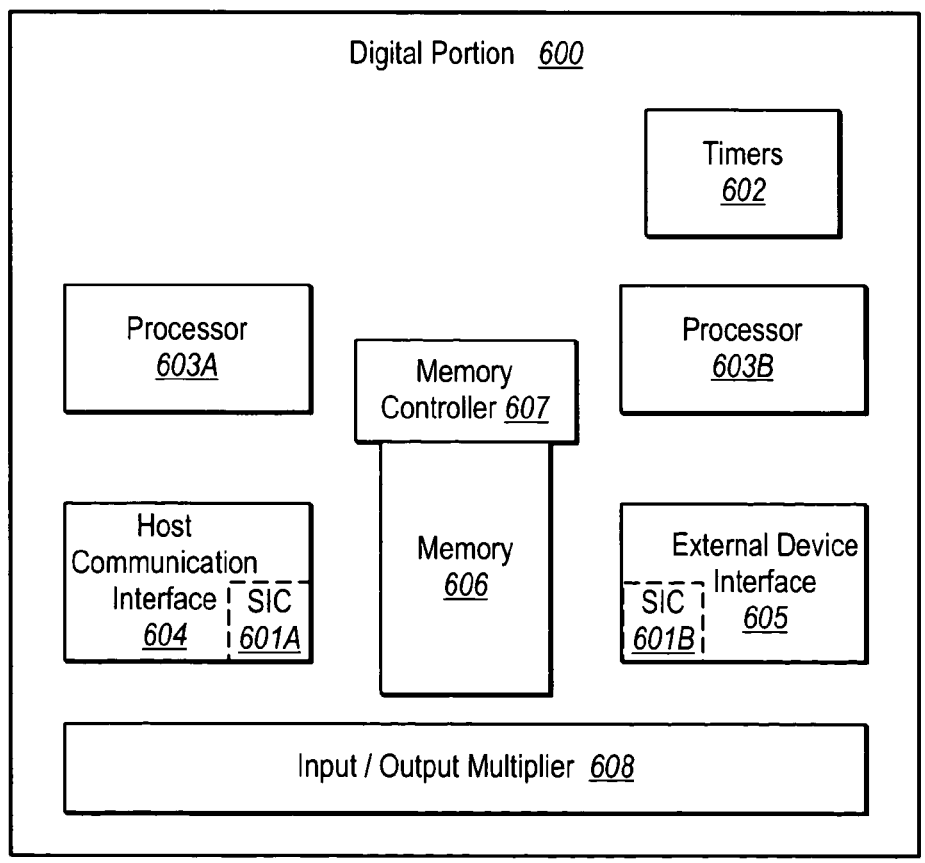
FIG. 6 illustrates a digital portion of the control chip illustrated in FIG. 5.

FIG. 6 illustrates the digital portion 600 of control chip 505 in further detail. For instance, a timer module 602 provides various timing signals used by the digital portion. Such timing signals may include, for example, programmable processor times. The timer module 602 may also act as a watchdog timer.

Two general-purpose processors 603A and 603B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 603A and 603B are each a 16-bit processor and may be identically structured.

A host communications interface 604 is used to communicate with the host using the serial clock line SCL and the serial data line SDA of the laser transmitter/receiver 500. The external device interface 605 is used to communicate with, for example, other modules within the laser transmitter/receiver 500 such as, for example, the post-amplifier 502, the laser driver 503, or the memory 506.

The memory 606 may be Random Access Memory (RAM). The memory control 607 shares access to the memory 606 amongst each of the processors 603A and 603B and with the host communication interface 604 and the external device interface 605. In one embodiment, the host communication interface 604 includes a serial interface controller 601A, and the external device interface 605 includes a serial interface controller 601B. The two serial interface controllers 601A and 601B may communicate using the two-wire interface described just above. One serial interface controller (e.g., serial interface controller 601B) being the master component, while the other serial interface controller (e.g., serial interface controller 601A) is a slave component.

An input/output multiplexer 608 multiplexes the various input/output pins of the control chip 505 to the various components within the control chip 505. This enables different components to dynamically assign pins in accordance with the then-existing operational circumstances of the chip. Accordingly, there may be more input\output nodes within the control chip 505 than there are pins available on the control chip 505, thereby reducing the footprint of the control chip 505. The structure described above with respect to FIGS. 3A and 3B represent one example of such an input/output multiplexer 608.

One possible I/O terminal configuration example will now be described with respect to FIG. 6. Suppose the serial interface controller 601B is a master serial controller. This master serial controller can be simultaneously configured to drive an I²C two wire interface (2 open drain bidir's), 2 FSB serial interfaces (1 clock output and 1 data input times 2 FSB's), and an SPI 4-wire interface (3 outputs: clock, chip-select, and data-out; and 1 input: data-in). The master serial controller would operate using one interface at a time, but all I/O can remain configured for its intended purpose.

Having described a specific environment with respect to FIGS. 5 and 6 in which the principles of the present invention described with respect to FIGS. 1, 2, 3A, 3B and 4 may be employed, it will be understood that this specific environment is only one of countless architectures in which the principles of the present invention may be employed. As previously stated, the principles of the present invention are not intended to be limited to any particular environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. An integrated circuit comprising the following:
   a plurality of input/output terminals including a configurable input/output terminal that may have an input/output designation as an input terminal, an output terminal, or a bi-directional terminal;
   an input/output designation mechanism configured to designate whether the configurable input/output terminal is an input terminal, an output terminal, or a bi-directional terminal;
   an input facilitation mechanism configured to allow a signal provided to the configurable input/output terminal to be received by the integrated circuit if the configurable input/output terminal is designated as an input terminal or a bi-directional terminal, wherein the input facilitation mechanism comprises an edge detection module; and
   an output facilitation mechanism configured to allow a signal provided by the integrated circuit to the output facilitation mechanism to be asserted on the configurable input/output terminal if the configurable input/output terminal is designated as an output terminal or a bi-direction terminal;
   a mechanism for changing the input/output designation of the configurable input/output terminal;
   an inversion designation mechanism configured to designated whether input signals and/or output signals should be inverted; and
   an inversion enforcement mechanism configured to enforce the inversion designation of the inversion designation mechanism.

2. An integrated circuit in accordance with claim 1, wherein the plurality of input/output terminals includes a plurality of configurable input/output terminals that may have an input/output designation as an input terminal, an output terminal, or a bi-directional terminal, wherein
   the input facilitation mechanism is configured, for each of the configurable input/output terminals designated as an input terminal or a bi-direction terminal, to allow a signal received at the configurable input/output terminal to be received by the integrated circuit; and
   the output facilitation mechanism configured, for each of the configurable input/output terminals designated as an output terminal or a bi-directional terminal, to allow a signal provided by the integrated circuit to the output facilitation mechanism to be asserted on the configurable input/output terminal.

3. An integrated circuit in accordance with claim 1, wherein the configurable input/output terminal is a digital terminal.

4. An integrated circuit in accordance with claim 1, further comprising the following:
   a plurality of signal sources;
   a signal source selection mechanism configured select one of a plurality of signal sources;
   a signal source routing mechanism configured to provide a signal from the selected signal source to the configurable input/output terminal if the configurable input/output terminal is designated as an output terminal or a bi-directional terminal.

5. An integrated circuit in accordance with claim 4, wherein the plurality of signal sources comprise a serial interface controller.

6. An integrated circuit in accordance with claim 5, wherein the plurality of signal sources comprise a plurality of serial interface controllers.

7. An integrated circuit in accordance with claim 5, wherein the plurality of signal sources comprise a clock.

8. An integrated circuit in accordance with claim 7, wherein the plurality of signal sources comprises a register.

9. An integrated circuit in accordance with claim 4, wherein the plurality of signal sources comprise a clock.

10. An integrated circuit in accordance with claim 9, wherein the plurality of signal sources comprises a register.

11. An integrated circuit in accordance with claim 4, wherein the plurality of signal sources comprises a register.

12. An integrated circuit in accordance with claim 4, wherein the plurality of signal sources comprises a single register bit.

13. An integrated circuit in accordance with claim 1, wherein the integrated circuit is implemented in a laser transmitter/receiver.

14. An integrated circuit in accordance with claim 13, wherein the laser transmitter/receiver is a 1 G laser transceiver.

15. An integrated circuit in accordance with claim 13, wherein the laser transmitter/receiver is a 2 G laser transceiver.

16. An integrated circuit in accordance with claim 13, wherein the laser transmitter/receiver is a 4 G laser transceiver.

17. An integrated circuit in accordance with claim 13, wherein the laser transmitter/receiver is a 10 G laser transceiver.

18. An integrated circuit in accordance with claim 13, wherein the laser transmitter/receiver is a laser transceiver suitable for fiber channels greater than 10 G.

19. An integrated circuit in accordance with claim 13, wherein the laser transmitter/receiver is an XFP laser transceiver.

20. An integrated circuit in accordance with claim 13, wherein the laser transmitter/receiver is an SFP laser transceiver.

21. An integrated circuit in accordance with claim 13, wherein the laser transmitter/receiver is a SFF laser transceiver.

22. An integrated circuit comprising the following:
a plurality of input/output terminals including a configurable input/output terminal that may have an input/output designation as an input terminal, an output terminal, or a bi-directional terminal;
an input/output designation mechanism configured to designate whether the configurable input/output terminal is an input terminal, an output terminal, or a bi-directional terminal;
an input facilitation mechanism configured to allow a signal provided to the configurable input/output terminal to be received by the integrated circuit if the configurable input/output terminal is designated as an input terminal or a bi-directional terminal, wherein the input facilitation mechanism comprises an edge detection module; and
an output facilitation mechanism configured to allow a signal provided by the integrated circuit to the output facilitation mechanism to be asserted on the configurable input/output terminal if the configurable input/output terminal is designated as an output terminal or a bi-direction terminal; and
a mechanism for changing the input/output designation of the configurable input/output terminal, wherein the integrated circuit is implemented in a laser transmitter/receiver.

23. An integrated circuit in accordance with claim 22, wherein the plurality of input/output terminals includes a plurality of configurable input/output terminals that may have an input/output designation as an input terminal, an output terminal, or a bi-directional terminal, wherein
the input facilitation mechanism is configured, for each of the configurable input/output terminals designated as an input terminal or a bi-direction terminal, to allow a signal received at the configurable input/output terminal to be received by the integrated circuit; and
the output facilitation mechanism configured, for each of the configurable input/output terminals designated as an output terminal or a bi-directional terminal, to allow a signal provided by the integrated circuit to the output facilitation mechanism to be asserted on the configurable input/output terminal.

24. An integrated circuit in accordance with claim 22, wherein the configurable input/output terminal is a digital terminal.

25. An integrated circuit in accordance with claim 22, further comprising the following:
a plurality of signal sources;
a signal source selection mechanism configured select one of a plurality of signal sources;
a signal source routing mechanism configured to provide a signal from the selected signal source to the configurable input/output terminal if the configurable input/output terminal is designated as an output terminal or a bi-directional terminal.

26. An integrated circuit in accordance with claim 25, wherein the plurality of signal sources comprise a serial interface controller.

27. An integrated circuit in accordance with claim 25, wherein the plurality of signal sources comprise a clock.

28. An integrated circuit in accordance with claim 25, wherein the plurality of signal sources comprises a register.

29. An integrated circuit in accordance with claim 25, wherein the plurality of signal sources comprises a single register bit.

30. An integrated circuit in accordance with claim 22, further comprising the following:
an inversion designation mechanism configured to designated whether input signals and/or output signals should be inverted; and
an inversion enforcement mechanism configured to enforce the inversion designation of the inversion designation mechanism.

* * * * *

UNITED STATES PATENT AND TRADEMARK OFFICE
CERTIFICATE OF CORRECTION

PATENT NO. : 7,426,586 B2
APPLICATION NO. : 10/970530
DATED : September 16, 2008
INVENTOR(S) : Gerald L. Dybsetter It is certified that error appears in the above-identified patent and that said Letters Patent is hereby corrected as shown below:

Title Page, Item (57)
ABSTRACT line 10, change "independent" to --independence--

Col. 1
Line 27 change "as" to --is--
Line 33 change "the delicate" to --between the delicate--
Line 34 change "appropriate" to --appropriately--

Col. 2
Line 56 change "above-mechanism" to --above mechanisms--

Col. 3
Line 32 change "being" to --are--

Col. 5
Line 25 change "serve" to --to serve--

Col. 8
Line 12 change "the then the" to --then the--
Line 36 change "signal" to --signals--
Line 42 change "signal" to --signals--
Line 45 change "the multiplexer" to --of the multiplexer--

Col. 9
Line 34 change ""InvertOutput"high," to --"InvertOutput"=high,--

Col. 10
Line 33 change "corresponding to the corresponding to the" to --corresponding to the--
Line 62 change "reversible" to --reversibly--

Col. 11
Line 7 change "to be" to --is to be--
Line 13 change "reversible" to --reversibly--
Line 37 change "403" to --404--

CERTIFICATE OF CORRECTION (continued)
U.S. Pat. No. 7,426,586 B2

Col. 12
Line 37 change "clock generator" to --a clock generator--
Line 60 change "control" to --controller--

Col. 14
Line 1,2 change "designated" to --designate--
Line 29 change "select" to --to select--

Col. 16
Line 20 change "select" to --to select--
Line 39,40 change "designated" to --designate--

Signed and Sealed this

Twenty-third Day of February, 2010

David J. Kappos
*Director of the United States Patent and Trademark Office*